US008225312B2

(12) United States Patent
DiCarlo et al.

(10) Patent No.: US 8,225,312 B2
(45) Date of Patent: Jul. 17, 2012

(54) METHOD AND APPARATUS FOR DOWNLOADING SOFTWARE UPDATES

(75) Inventors: Jennifer M. DiCarlo, Fort Myers, FL (US); Divyesh Jariwala, Hackensack, NJ (US); Samir Bajaj, Mahwah, NJ (US); David Allen Hofmann, Fort Myers, FL (US); Brent Roy Avera, Cape Coral, FL (US); Anthony Capobianco, Cape Coral, FL (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1414 days.

(21) Appl. No.: 11/504,525

(22) Filed: Aug. 14, 2006

(65) Prior Publication Data
US 2007/0094658 A1 Apr. 26, 2007

Related U.S. Application Data

(60) Provisional application No. 60/707,833, filed on Aug. 12, 2005.

(51) Int. Cl.
*G06F 9/445* (2006.01)
(52) U.S. Cl. ........................................ 717/178; 717/175
(58) Field of Classification Search ........... 717/174–178
See application file for complete search history.

(56) References Cited

U.S. PATENT DOCUMENTS

| 5,745,681 | A | 4/1998 | Levine et al. ............... 395/200.3 |
| 6,327,617 | B1 | 12/2001 | Fawcett ......................... 709/219 |
| 6,594,690 | B2 | 7/2003 | Cantwell ....................... 709/217 |
| 6,636,721 | B2 * | 10/2003 | Threadgill et al. ............ 455/12.1 |
| 6,999,916 | B2 * | 2/2006 | Lin et al. ............................ 704/8 |
| 7,089,259 | B1 * | 8/2006 | Kouznetsov et al. .................. 1/1 |
| 7,664,630 | B2 * | 2/2010 | Fukuoka et al. .................... 704/8 |
| 7,685,204 | B2 * | 3/2010 | Rogers .......................... 707/770 |
| 8,078,505 | B2 * | 12/2011 | Veres et al. .................... 705/27.1 |
| 2001/0002852 | A1 * | 6/2001 | Kwoh ........................... 348/465 |
| 2003/0055919 | A1 | 3/2003 | Fong et al. |
| 2003/0126236 | A1 * | 7/2003 | Marl et al. ..................... 709/220 |
| 2005/0157663 | A1 * | 7/2005 | Alves et al. .................... 370/255 |
| 2005/0197906 | A1 | 9/2005 | Kindig et al. ................... 705/15 |

(Continued)

OTHER PUBLICATIONS

Azakster-Azakster Download Manager by JDGSoft.com (Java/Multi-OS); Windows desktop Mgmt; 2005 softplatz.com by Misha Yurasov; downloaded from the internet www.softplatz.com/Soft/Network-Internet/Downloaded-Managers/Azakster.html.

(Continued)

*Primary Examiner* — Anna Deng
(74) *Attorney, Agent, or Firm* — Stuart H. Mayer, Esq.; Karin L. Williams, Esq.; Mayer & Williams PC (57) ABSTRACT

In accordance with the present invention, a method and apparatus that provides software products for installation on a user terminal is provided. The method begins by receiving over a communications network a user selection that includes a choice of a plurality of user-selected software products to be downloaded. In response to receipt of the user selection, an installation guide is assembled that includes installation instructions associated with each of the user-selected software products. A single user command is received over the communications network that includes a request to begin downloading the user-selected software products. In response to the request, the user-selected software products and the installation instructions are sequentially downloaded over the communications network to the user terminal.

13 Claims, 7 Drawing Sheets

U.S. PATENT DOCUMENTS

| | | | |
|---|---|---|---|
| 2005/0251562 A1* | 11/2005 | Hauduc et al. | 709/217 |
| 2006/0223517 A1* | 10/2006 | Rajaram et al. | 455/419 |
| 2009/0083842 A1* | 3/2009 | Smith et al. | 726/7 |
| 2010/0180271 A1* | 7/2010 | Arsenault et al. | 717/168 |

OTHER PUBLICATIONS

Downloaded Accelerator, a faster download manager; 1999-2006; downloaded form the internet www.speedbit.com.

Internet Download Manager: the faster download accelerator; New! Internet Download Manager v5.03—The best way to handle your downloads and increase download speeds; 1999-2006; downloaded from the internet www.internetdownloadmanager.com.

Microsoft Update; downloaded from the internet www.update.microsoft.com/windowsupdate/v6/default.aspx?in=en on Jun. 30, 2006.

Microsoft Windows Update, Zillasoft.ws, downloaded from the internet www.zillasoft.ws on Jun. 30, 2006.

* cited by examiner

METHOD AND APPARATUS FOR DOWNLOADING SOFTWARE UPDATES

STATEMENT OF RELATED APPLICATIONS

This application claims the benefit of U.S. Provisional Patent Application Ser. No. 60/707,833, filed Aug. 12, 2005, entitled "Download Taxi", which is incorporated herein by reference in its entirety.

FIELD OF INVENTION

The present invention relates generally to a user or client computer that downloads software updates from a remote server over a communications network, such as the Internet.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. section 1.14.

BACKGROUND

The continual and rapid development of computers, computer software, and related technology has revealed many problems with the typical distribution channels for computer software. For example, computer software, the coded instructions that control a computer's operation, are constantly and incrementally being upgraded and improved. The computer hardware and operating system environment on which the computer software is used is continually being changed, which requires additional changes in the computer software (e.g., new device drivers, new operating system calls, etc.).

A computer software developer will typically release an initial version of a software product. Thereafter, as new and improved computers and peripherals are developed, the software product will commonly be upgraded so as to take full advantage of the increased capabilities of the improved hardware. In addition, a software developer, to remain competitive, will often upgrade the software product to provide new features and functionality.

With the ever-increasing pace of advancement in computer related technologies, software developers compete to be the first to offer a new feature or upgrade. As a result, sometimes software products are made available to the public with unknown errors or defects. Similarly, software products that work as intended on a particular computer with a particular configuration may fail when installed on a different computer having a different configuration (e.g., different hardware, peripherals, operating systems, etc.). Software developers frequently provide fixes for their software products to correct defects that were undetected or unanticipated at the time the software product was released. Fixes are also provided to allow the software product to function correctly on a new computer or with a different operating system environment.

It is often difficult for software developers to make upgrades and fixes available to users. This difficulty not only deprives the user of access to the most reliable and up-to-date software products, it can result in lost sales to the software developer and can damage the goodwill and the development of a long term relationship with a customer by releasing a flawed or deficient software product.

Commonly, mass distribution of commercial software products is accomplished by copying the software product onto storage media (e.g., CD-ROMs, floppy disks, magnetic tapes, etc.). To take advantage of economies of scale, typically a large number of copies of the software product are made during the manufacture of a particular software product. Then, the storage media containing the software product is provided to distributors and retailers for sale to users. Given the rapid pace of software development, however, this manner of distribution is frequently insufficient. For example, it is not uncommon that defects are detected and fixes created shortly after a software product is introduced to the public. But the software products that remain in the distribution chain contain the defect without the fix. This situation is frustrating for users who subsequently purchase the software product that is already obsolete (i.e., because of the defects).

Software can also be distributed over a communications network, such as the Internet and the like. In such distribution systems, a user connects to a remote site (e.g., an update server) and then selects and downloads desired software. Such systems allow for rapid updating of software by simply supplying a new, updated version of the software to the user. This updated software distribution scheme requires the user to select, download, and install the new software. The user may also need to obtain updated help files and other help utilities to assist the user in installing the updated software. This process is further complicated when the user wishes to download multiple software updates. Such a situation may arise, for example, when a manufacturer or vendor makes available a wide variety of electronic products that each may employ software that on occasion may be updated. For instance, a single manufacturer or vendor may offer a wide variety of consumer electronics, such as personal computers, personal digital assistants (PDAs), video cameras, digital cameras, MP3 players, and the like. After viewing the available software and selecting the software items that are desired, a user may be confronted with the need to download a relatively large number of software updates or other software products for multiple devices. The process of downloading and installing the new software can quickly become cumbersome and intimidating for a typical computer user when multiple software updates are required.

SUMMARY OF THE INVENTION

In accordance with the present invention, a method and apparatus that provides software products for installation on a user terminal is provided. The method begins by receiving over a communications network a user selection that includes a choice of a plurality of user-selected software products to be downloaded. In response to receipt of the user selection, an installation guide is assembled that includes installation instructions associated with each of the user-selected software products. A single user command is received over the communications network that includes a request to begin downloading the user-selected software products. In response to the request, the user-selected software products and the installation instructions are sequentially downloaded over the communications network to the user terminal.

In accordance with one aspect of the invention, the request to begin downloading the user-selected software products is received from a dedicated user update application. The user update application is associated with an update service center that receives the request, and the user update application resides on the user terminal.

In accordance with another aspect of the invention, the user selection includes a selected language preference selected from a plurality of available language preferences.

In accordance with another aspect of the invention, the installation guide is downloaded in the selected language.

In accordance with another aspect of the invention, a request to pause the sequential download of the user-selected software products until a later time is received.

In accordance with another aspect of the invention, the plurality of software products are software products associated with at least one consumer electronic device selected from the group consisting of a personal computer, personal digital assistant, video camera, digital camera, an audio player, and a video player.

In accordance with another aspect of the invention, the plurality of software products are software products associated with at least two consumer electronic devices selected from the group consisting of a personal computer, personal digital assistant, video camera, digital camera, an audio player, and a video player.

In accordance with another aspect of the invention, the software product comprises a software update, driver, or patch.

In accordance with another aspect of the invention, an identification of the individual software products to be downloaded and installed on the user terminal is transmitted over the communications network.

In accordance with another aspect of the invention, a query is transmitted over the communication network to determine if a dedicated user application associated with the update service center is installed on the user terminal.

In accordance with another aspect of the invention, the user application is downloaded if it has not been previously installed on the user terminal.

In accordance with another aspect of the invention, a list of available software products is sent from the update service center to the user terminal in response to a request from the user terminal.

In accordance with another aspect of the invention, the user-selected software products are downloaded to the user terminal in files having filenames that identify a date and time of the download.

In accordance with another aspect of the invention, a software update application is provided. The update application includes an interface software module that initiates, establishes, and terminates communication over a communication network with a user terminal and a receiving software module that receives over the communications network a user selection that includes a choice of a plurality of user-selected software products to be downloaded. The application also includes an assembling software module that assembles an installation guide in response to receipt of the user selection. The installation guide includes installation instructions associated with each of the user-selected software products. A downloading software module is provided in the application for sequentially downloading the user-selected software products and the installation instructions over the communications network to the user terminal in response to a user request.

In accordance with another aspect of the invention, the installation guide is assembled in the selected language.

In accordance with another aspect of the invention, the receiving module also receives a request to pause the sequential download of the user-selected software products until a later time.

DETAILED DESCRIPTION

The embodiments of the invention described herein are implemented as logical operations in a distributed processing system having client and server computing systems. It should be noted that the terms "server" and "client" may refer to either the software, the machine(s) on which the software is running, or a combination of both. The logical operations of the present invention are implemented (1) as a sequence of computer-implemented processes running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps, processes or modules.

The inventors have recognized that the process of updating one or more software products can be streamlined and made less cumbersome for the user, particularly when multiple software products are to be downloaded. The methods and modules described herein allow the user to download multiple software products using a single process that does not require the user to repetitively perform a sequence of steps to download each and every program file one after the other. Moreover, the user can pause the download process and resume it at a later, more convenient time. The user can also select from among a variety of languages in which to perform the download process. Among other things, instruction guides can be downloaded to the user in the user's choice of language. The instruction guide may be customized for the particular user by assembling the various installation instructions for each selected software product to be downloaded into a single composite instruction guide. The composite instruction guide can then be downloaded to the user in a single file, thereby avoiding the need for the user to separately download each individual instruction manual for each software product to be downloaded. The user can perform the process using any of a number of web browsers (including, for example, Internet Explorer™, Netscape™, and Firefox™) and any of a number of different operating systems.

Figure 1:
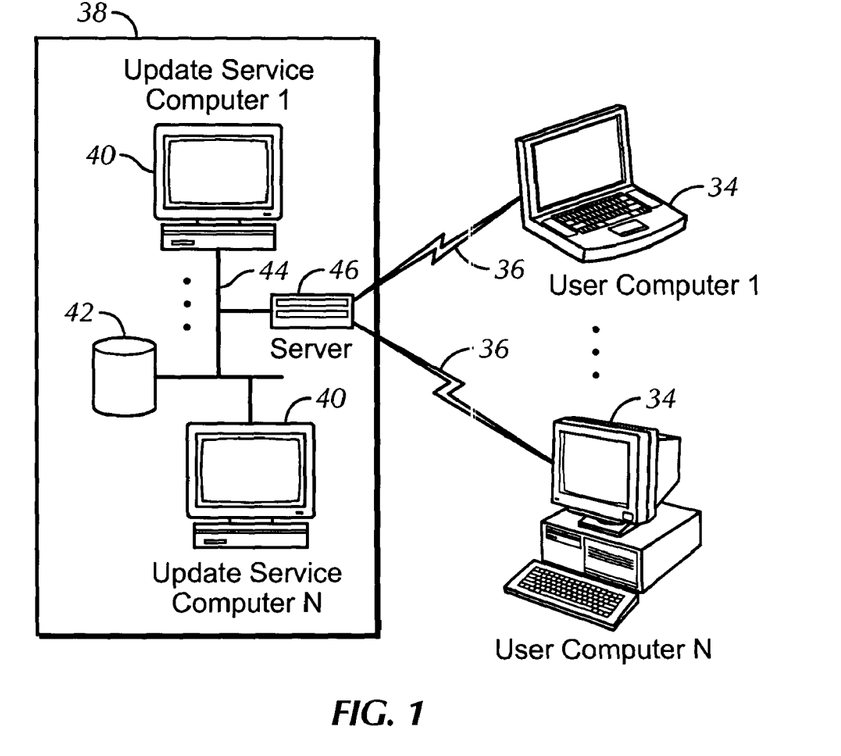
FIG. 1 is a block diagram of an illustrative high-level architecture of the operating environment in which the present invention may be employed.

FIG. 1 is a block diagram of an illustrative high-level architecture of the operating environment in which the present invention may be employed. One or more user terminals or computers 34 are connected over communications links 36 to an update service center 38. The update service center 38 includes one or more computers 40 that are capable of simultaneous access by a plurality of user terminals or computers 34. If a plurality of update service computers 40 are used, then the update service computers may be connected by a local area network (LAN) 44 or any other similar connection technology. It is also possible for an update service center to have other configurations. For example, a smaller number of larger computers (i.e., a few mainframe, mini, etc. computers) with a number of internal programs or processes running on the larger computers capable of establishing communications links to the user computers. The update service center 38 may also be connected to a network (e.g., the Internet). The remote network or remote site allows the update service center 38 to provide a wider variety of computer software than could be stored at a single centralized update service center. That is, the software products are not necessarily all stored at a single location. In some cases the update service center 38 may be coupled via a network link to one or more other sites, remote from the service center 38. Software products can be stored on these other sites. If the user accesses the service center 38 for an update, the service center 38 in turn accesses the appropriate site at which the requested software is stored. The requested software is then transferred from that site via the service center 38 to the requesting user's computer 34.

One or more databases 42 connected to the update center computer(s) 40 are used to store database entries consisting of computer software available on the update service computer(s). The update service computer(s) 40 also contain a plurality of communication interfaces, such as telecommunications connections (e.g., modem connections, ISDN connections, ATM connection, frame relay connections, etc.), network connections (e.g. Internet, etc.), satellite connections (e.g. Digital Satellite Services, etc.), wireless connections, two way paging connections, etc., to allow one or more user computers 34 to simultaneously connect to the update service computer(s) 40. The interface connections are managed by an update server 46.

Figure 2:
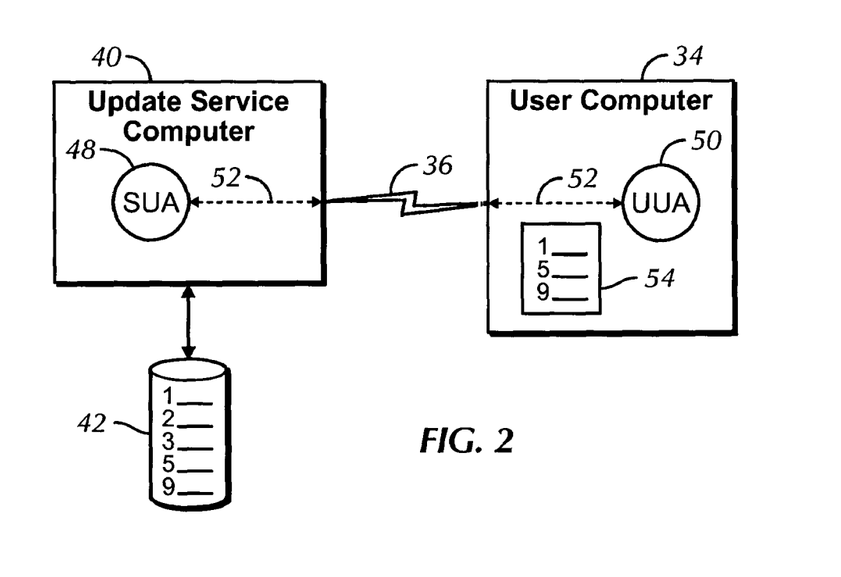
FIG. 2 shows the update service computer and the user computer depicted in FIG. 1.

As shown in FIG. 2, running on the update service computer(s) 40 is one or more service update applications (SUA) 48 that communicate with a user update application (UUA) 50 on the user computer 34 when the update service is contacted by a user via user computer 34. The user update application 50 is a computer software program that is capable of initiating, establishing, and terminating two-way communications with an update service application on the update service computer. The service update application 48 is a computer software program which is also capable of initiating, establishing, and terminating two-way communications with a user update application on a user computer.

To access the update service center 38, a user starts UUA 50 on the user computer 34 (alternatively, the user can use a web browser to access the update service center 38 via its network address, e.g., URL). The user update application 50 tries to establish communication over two-way communications link 36 with an update service computer 40 using a modem, a network connection (e.g. Internet), etc. However, this access can also be completed by a variety of other methods which provide two-way data transfer. As the user update application 50 on the user computer 34 establishes communication with the update service computer 40, the update service computer 40 starts SUA 48. The service update application 48 then tries to establish a two-way communications link to the user update application 50 on the user computer. This is shown by the dashed lines 52 in FIG. 2. This communications link can be established with a network protocol stack, (e.g. TCP/IP) through sockets, or any other two-way communications technique known in the art. Once communication has been established, the service update application 48 allows the user to view, select, and download various software products. Once the software products are selected, the download and installation process is facilitated by the user update application 50 in the manner described below.

Figure 3:
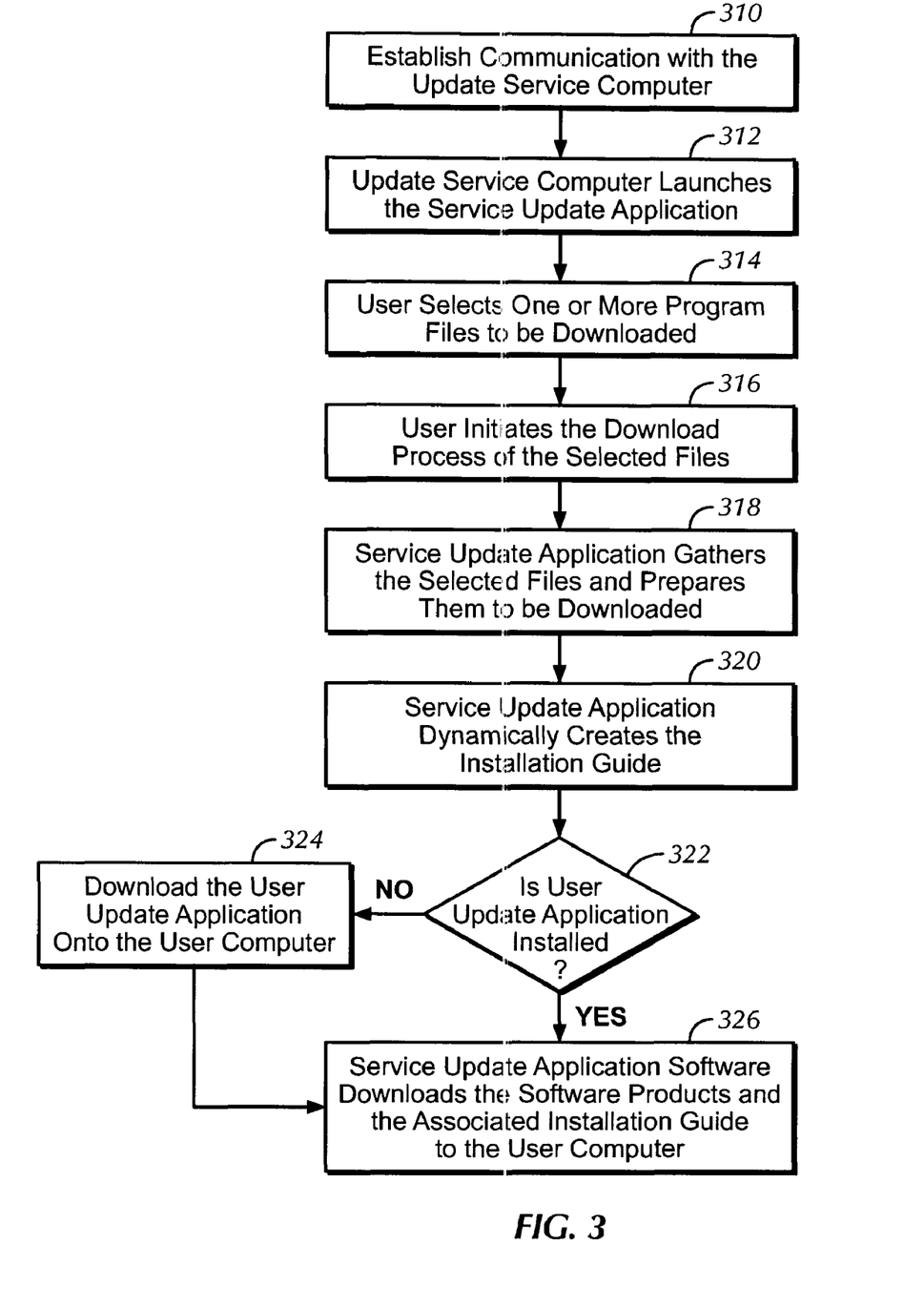
FIG. 3 is a flowchart showing one example of a process by which software updates may be downloaded in accordance with the present invention.

As shown in the flowchart of FIG. 3, at 310 a user begins the download process by establishing communication with the update service center 38. When the user makes the desired connection, the update service computer 40 launches the service update application 48 at 312. The service update application 48 presents the user with an interface (e.g., a web page) on the user computer 34 through which the user can select software that the user wishes to download and install. The user can select from a wide range of computer software products that are available for, e.g., various consumer electronics devices, such as personal computers (desktop, laptop, and the like), PDAs, video cameras, digital cameras, audio players (e.g., MP3-type), video players, and the like. The software that is available may include, for example, new computer software, patches, fixes, drivers, new help files, wizards, operating system components, and updates, as well as enhancements and new features of existing computer software. The available software may also include entries describing new computer software (i.e., computer software that is not previously existing on the user computer 34).

At 314 the user selects one or more program files to be downloaded. After making all the desired selections, the user initiates the download process of the selected files in at 316, typically by activation or selection of a single icon presented by the update service center.

Next, at 318 the service update application 48 gathers the selected files and prepares them to be downloaded. In addition, the service update application 48 prepares an installation guide, which is a collection of installation instructions for the selected files. The service update application 48 dynamically creates the installation guide at 320 from various database entries and html installation files that may be located on any of the various service computers 40 or databases 42 associated with the update service center 38. The installation guide generally will be assembled in the language the user has selected to communicate in with the service update application 48. At 320 the service update application 48 queries the user if the user update application 50 is installed on the user computer 34. If at 322 the answer is no, the user is instructed to download the user update application 50 at 324. Finally, once the user update application is installed the service update application software 48 downloads the software products (e.g., executable program files) and the associated installation guide to the user computer 34 at 326.

One particular example of an update service application that is currently used by consumers is the Sony® Download Taxi™. The Sony® Download Taxi™ is an update service application through which a consumer can download software updates for many different consumer electronic products such as those described above, including, for instance, personal computers, PDAs, video cameras, digital cameras, MP3 players and the like. The Sony® Download Taxi™ represents one example of a pre-existing update service application of the type described above in which the features, functionality and modules of the present invention may be employed. For purposes of illustration and not as a limitation on the invention additional features and functionality of the present invention will be shown in FIGS. 4-8 in connection with the Sony® Download Taxi™. Of course, the features, functionality, methods and modules of the present invention may be employed in connection with any appropriate update service application whether pre-existing or developed in the future.

Figure 4:
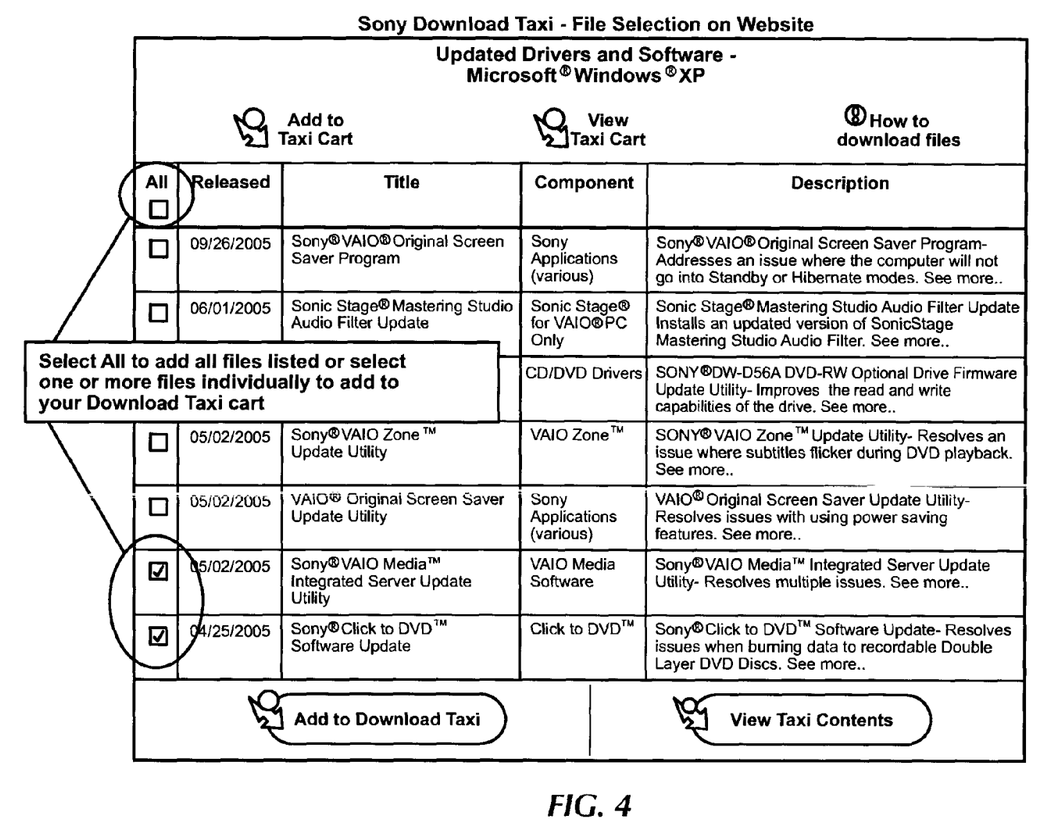
FIGS. 4-8 show illustrative user interface screens that are presented by one particular example of AN update service application referred to as the Sony® Download Taxi™.
Figure 5:
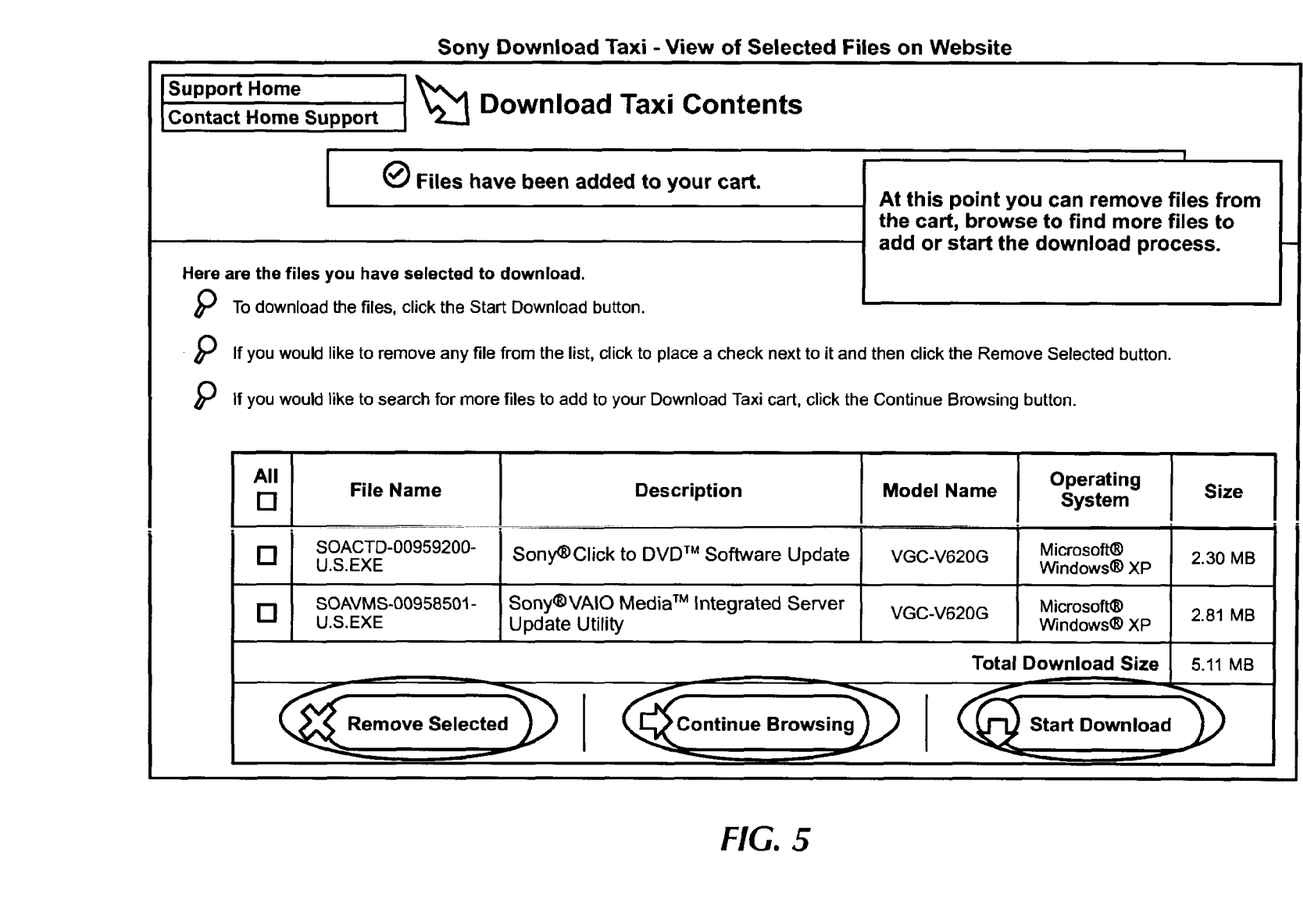
Figure 6:
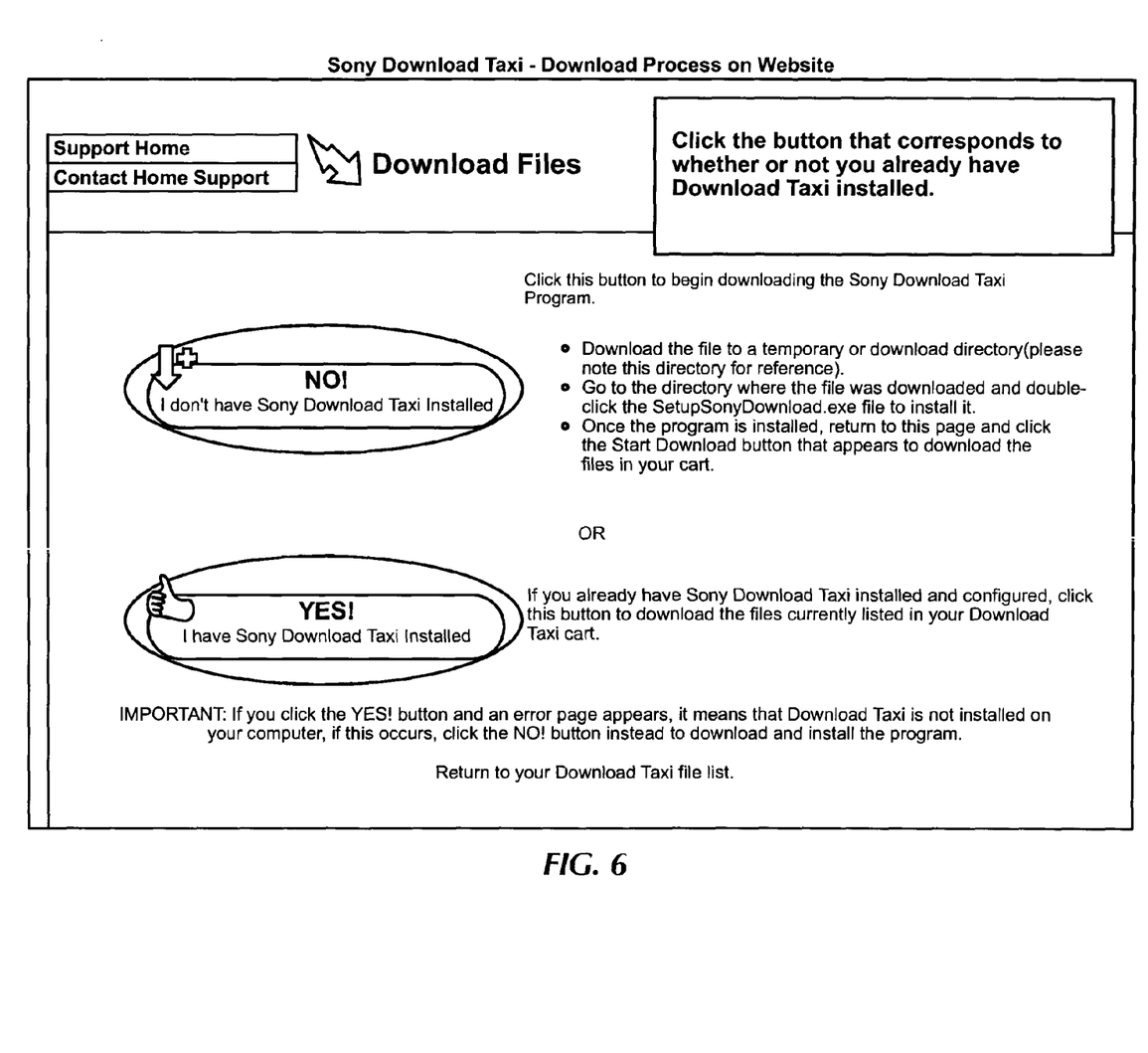

FIG. 4 shows an illustrative graphical user interface presented by the Sony® Download Taxi™ on the computer screen of the user computer 34. In this example the update service application interface uses a shopping cart metaphor. Via the interface, the user may browse through a wide selection of consumer electronic products available from Sony. In the interface depicted in FIG. 4, the user is presented with a number of software upgrades and drivers associated with the Microsoft® Windows™ operating system. As shown, a release date, title and description of each software product is provided. The interface includes selectable icons that allow the user to individually choose from among the software products that are displayed. Another selectable icon is provided to allow the user to choose all the software products presented in that particular page of the interface. FIG. 5 is another interface screen that shows a list of the software products that have been selected by the user and moved to his or her shopping cart. All downloads selected by the user are stored in a session table, along with other session details, on the update service center 38. The list of selected files is associated with a unique session identification (ID). At this point the user is presented with a number of options that allows the user to remove selected software products, continue browsing for additional software products, or begin the download process. A selectable icon is provided for each of these options. FIG. 6 shows the interface screen that is presented to the user after choosing to begin the download process. The user is asked if the Sony® Download Taxi™ (i.e., the user update application) has been installed on their user computer. If not, the user is requested to install it at this point in the process.

Figure 7:
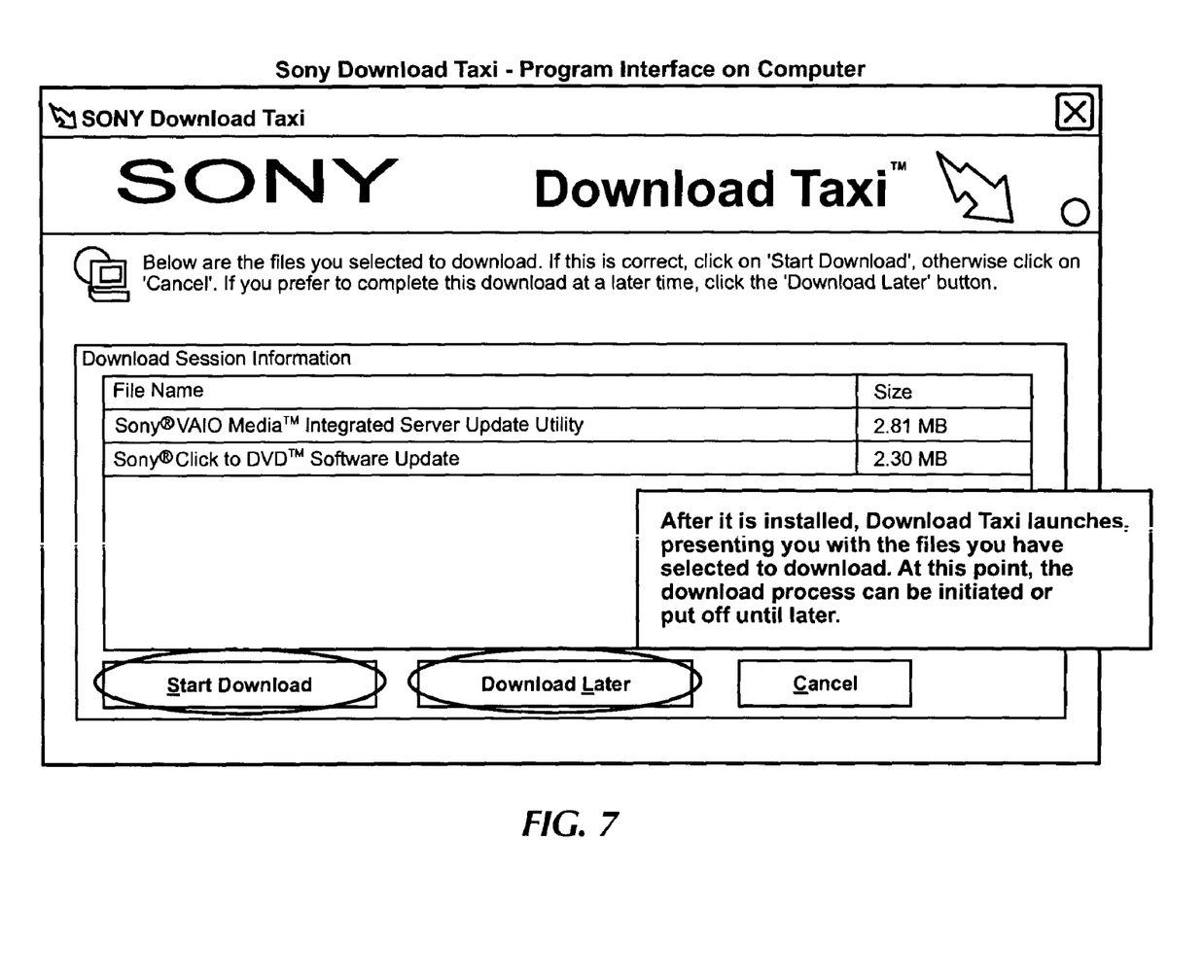

FIG. 7 shows the interface screen of the Sony® Download Taxi™ when it is opened after beginning the download process with the service update application 50. The Download Taxi™ interface shows software products that have been selected for downloading. The user is presented with the options to begin the download process, to begin the download process at a later time, or to cancel the download process. A selectable icon is provided for each of these options.

Figure 8:
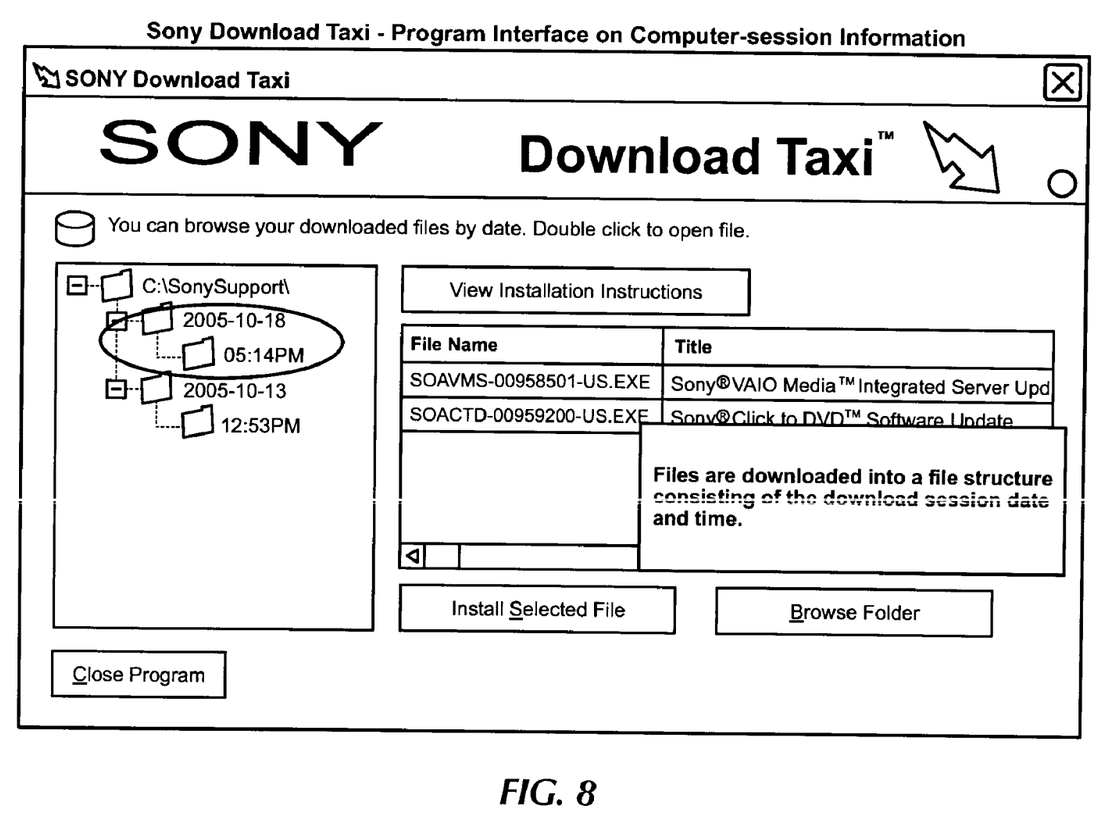

In FIG. 8 the interface screen of the Sony® Download Taxi™ is shown after the files have been downloaded into a common folder on the user's computer 34. The file structure consists of the download session date and time. In the particular example of FIG. 8 the software products are stored in the folder C:\Sony Support\YYYY-MM-DD, where YYYY-MM-DD signifies the date on which the download started. The Sony® Download Taxi™ stores the download details for a given download ID. on the user computer 34, thus preventing the loss of the download cart if the user's session is interrupted or otherwise lost. The Sony® Download Taxi™ records the state of the download in a file under the folder C:\Sony Support. The file includes the following details: session ID; a list of files and their associated update ID in the given download; the time when the download process started; the name of the file which is currently being downloaded; the number of bytes that have been downloaded for the current file; and a list of files that have already been downloaded during the session. Before a file is downloaded, the Sony® Download Taxi™ uses the Update ID to check the status of a particular update on the update service center 38. If it is inactive, the Sony® Download Taxi™ skips the file. It also confirms the location of the file and its cyclic redundancy check (CRC) value before it starts downloading the file. If the Sony® Download Taxi™ aborts abnormally (e.g., the user computer is rebooted, the user closes the program accidentally) during its next run it checks the download log in C:\Sony Support folder and continues from where it left off.

While downloading a software product, the Sony® Download Taxi™ saves incremental portions (e.g., 100 kb) of the downloaded file, thus ensuring that the user does not lose more than this amount of data if the program is abnormally terminated.

Returning to FIG. 8, the interface screen also provides selectable icons that allow the user to view the downloaded installation guide and to begin the installation process of the downloaded software products. During installation, the Sony® Download Taxi™ creates a registry key in the operating systems to create a special protocol named 'Sony Support' and associates it with the Sony® Download Taxi™.

It should be noted that the present invention is generally applicable to a situation in which the user makes the initial contact with the update service center 38 and determines the software products that are desired. That is, the user pulls the software products from the update service center 38. In some cases, however, the present invention may be applicable to a situation in which the update service center 38 inventories the software installed on the user computer 34, identifies additional software that may be appropriate for the user computer and makes the identified software available to the user computer 34.

The invention claimed is:

1. A method that provides software products for installation on a user terminal, comprising:
   receiving over a communications network a user selection that includes a choice of a plurality of user-selected software products to be downloaded, wherein the user selection includes a selected language selected from a plurality of available language preferences;
   in response to receipt of the user selection, dynamically assembling an installation guide from multiple different files, wherein the installation guide is customized and is a single composite that includes installation instructions from a plurality of individual installation instructions, each of the plurality of individual installation instructions associated with each of the plurality of user-selected software products, and the installation guide is assembled in the selected language;
   receiving over the communications network a single user command that includes a request to begin downloading the user-selected software products; and
   in response to the request, sequentially downloading the user-selected software products and the installation guide over the communications network to the user terminal,
   wherein the user-selected software products are downloaded to the user terminal in files having filenames that identify a date and time of the download.

2. The method of claim 1, wherein the request to begin downloading the user-selected software products is received from a dedicated user update application, wherein the user update application is associated with an update service center that receives the request, and wherein the user update application resides on the user terminal.

3. The method of claim 1 further comprising receiving a request to pause the sequential download of the user-selected software products until a later time.

4. The method of claim 1 wherein the plurality of software products are software products associated with at least two consumer electronic devices selected from the group consisting of a personal computer, personal digital assistant, video camera, digital camera, an audio player, and a video player.

5. The method of claim 1 wherein the software product comprises a software update, driver, or patch.

6. The method of claim 1 further comprising transmitting over the communications network an identification of the individual software products to be downloaded and installed on the user terminal.

7. The method of claim 1 further comprising transmitting a query over the communication network to determine if a dedicated user application associated with the update service center is installed on the user terminal.

8. The method of claim 7 further comprising downloading the user application if it has not been previously installed on the user terminal.

9. The method of claim 2 wherein a list of available software products is sent from the update service center to the user terminal in response to a request from the user terminal.

10. A non-transitory computer-readable medium includes instructions which, when executed by one or more processors in an electronic device, performs a method for providing software products to download for installation on a remote user terminal, comprising:
   receiving over a communications network a user selection that includes an identification of a plurality of user-selected software products to be downloaded, wherein the user selection includes a selected language selected from a plurality of available language preferences;
   in response to receipt of the user selection, dynamically assembling an installation guide from multiple different files, wherein the installation guide is customized and is a single composite that includes installation instructions from a plurality of individual installation instructions, each of the plurality of individual installation instructions associated with each of the plurality of user-selected software products, and the installation guide is assembled in the selected language;
   receiving over the communications network a single user command that includes a request to begin downloading the user-selected software products; and
   in response to the request, sequentially downloading the user-selected software products and the installation guide over the communications network to the user terminal.

11. A non-transitory computer-readable medium includes instructions which, when executed by one or more processors in an electronic device, implements software update module, comprising:
   an interface software module that initiates, establishes, and terminates communication over a communication network with a user terminal;
   a receiving software module that receives over the communications network a user selection that includes a choice of a plurality of user-selected software products to be downloaded, wherein the user selection includes a selected language selected from a plurality of available language preferences;
   an assembling software module that in response to receipt of the user selection assembles an installation guide from multiple different files, said installation guide is customized and is a single composite that includes installation instructions from a plurality of individual installation instructions, each of the plurality of individual installation instructions associated with each of the plurality of user-selected software products, and the installation guide is assembled in the selected language;
   the receiving software module that receives over the communications network a single user command that includes a request to begin downloading the user-selected software products; and
   a downloading software module that sequentially downloads the user-selected software products and the installation guide over the communications network to the user terminal in response to the request.

12. The software update application of claim 11 wherein the receiving module also receives a request to pause the sequential download of the user-selected software products until a later time.

13. The software update application of claim 11 wherein the plurality of software products are software products associated with at least one consumer electronic device selected from the group consisting of a personal computer, personal digital assistant, video camera, digital camera, an audio player, and a video player.

* * * * *